(12) United States Patent
Gupta et al.

(10) Patent No.: US 8,627,024 B2
(45) Date of Patent: Jan. 7, 2014

(54) SNAPSHOT BASED REPLICATION

(75) Inventors: Karan Gupta, San Jose, CA (US);
Roger L Haskin, Morgan Hill, CA (US);
Prasenjit Sarkar, San Jose, CA (US);
Dinesh K. Subhraveti, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/957,285

(22) Filed: Nov. 30, 2010

(65) Prior Publication Data

US 2012/0137094 A1 May 31, 2012

(51) Int. Cl.
*G06F 12/16* (2006.01)

(52) U.S. Cl.
USPC ............ 711/162; 711/161; 711/169; 714/6.1; 714/6.23

(58) Field of Classification Search
USPC .................. 711/162, 161, 169; 714/6, 6.231
See application file for complete search history.

(56) References Cited

U.S. PATENT DOCUMENTS

| | | | |
|---|---|---|---|
| 6,829,687 B2 * | 12/2004 | Pai ............................... | 711/162 |
| 7,092,976 B2 | 8/2006 | Curran et al. | |
| 7,174,430 B1 * | 2/2007 | O'Krafka et al. ............. | 711/141 |
| 7,668,876 B1 | 2/2010 | Kulkarni | |
| 7,769,722 B1 | 8/2010 | Bergant | |
| 8,209,511 B2 * | 6/2012 | Tomita et al. ................. | 711/165 |
| 2003/0182322 A1 | 9/2003 | Manley | |
| 2004/0162858 A1 | 8/2004 | Messer | |
| 2004/0215904 A1 * | 10/2004 | Gopisetty et al. ............. | 711/153 |
| 2004/0267830 A1 | 12/2004 | Wong | |
| 2005/0033936 A1 * | 2/2005 | Nakano et al. ................. | 711/170 |
| 2009/0037418 A1 * | 2/2009 | Xu et al. ........................... | 707/8 |

* cited by examiner

*Primary Examiner* — Jae Yu
(74) *Attorney, Agent, or Firm* — Lieberman & Brandsdorfer, LLC

(57) ABSTRACT

Embodiments of the invention relate to data replication and block allocation in a file system to support write transactions. Regions in a cluster file system are defined to support a block allocation. Blocks in the defined regions are allocated to support the data replication. A pipeline manager is provided to schedule population of the blocks in the allocated region(s) based upon network characteristics.

8 Claims, 6 Drawing Sheets

SNAPSHOT BASED REPLICATION

BACKGROUND

This invention relates to data storage in a computer system environment. More specifically, the invention relates to data replication and block allocation in a file system to support read and write transactions.

A data storage block or a storage block, herein after referred to as a block, refers to specific areas of address space on a storage device. For example, one data block may be a collection of sectors or bytes in an area of disk space. Blocks are manipulated as units. Large block allocations allow a large amount of data to be retrieved in a single I/O transaction. In one embodiment, a block is a fixed-size unit of data that is transferred together. A file system is a collection of file data maintained by an implementation that stores, organizes, and maintains file data in a file and/or directory hierarchy. File systems employ techniques to write data to storage media using block allocation techniques. Typically, a storage system provides access to information that is stored on one or more storage devices connected to the storage system. Access to the information is possible by organizing the storage devices into volumes, which logically organize the information stored on the storage devices.

The storage system may be further configured to operate according to a client/server model of information delivery to thereby allow many clients to access data containers stored on the system. In this model, the client may employ an application, such as a database application, executing on a computer that connects to the storage system over a computer network. Each client may request the services of the storage system by issuing file-based protocol messages to the system over the network. A plurality of storage systems may be interconnected to provide a storage system environment configured to service many clients. Each storage system may be configured to service one or more volumes, wherein each volume stores one or more data containers.

BRIEF SUMMARY

This invention comprises a system and article for pipelining replication of data across a cluster file system.

In one aspect, a computer system is provided with a cluster file system having multiple server nodes in communication across a network. The cluster file system includes a first data storage local to a first server node, a second data storage local to a second server node, and a third data storage local to a third server node. A write manager is provided to write a first copy of data from a client machine to the first data storage local to the first server node in the cluster. In addition, a pipeline manager is provided in communication with both the write manager and an allocation manager. Prior to replication, the allocation manager allocates storage for a second copy of the data on the second data storage local to the second server node and allocates storage for a third copy of the data on the third data storage local to the third server node. Following the allocation by the allocation manager, the pipeline manager schedules population of the second data storage and the third data storage with the first copy of the data based upon network characteristics.

In another aspect, a computer program product is provided with a computer readable storage medium having embodied computer readable program code. More specifically, computer readable program code is provided to write a first copy of data on a first data storage local to a first server node. In addition, computer readable program code is provided to pipeline replication of the first copy of data. The replication includes allocating storage for a second copy of the data on a second data storage local to a second server node and allocating storage for a third copy of the data on a third data storage local to a third server node. Computer readable program code is also provided to schedule population of the allocated storage on both the second and third data storage with the first copy of data local to the first server node. The aspect of populating the allocated storage is executed based upon network characteristics.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
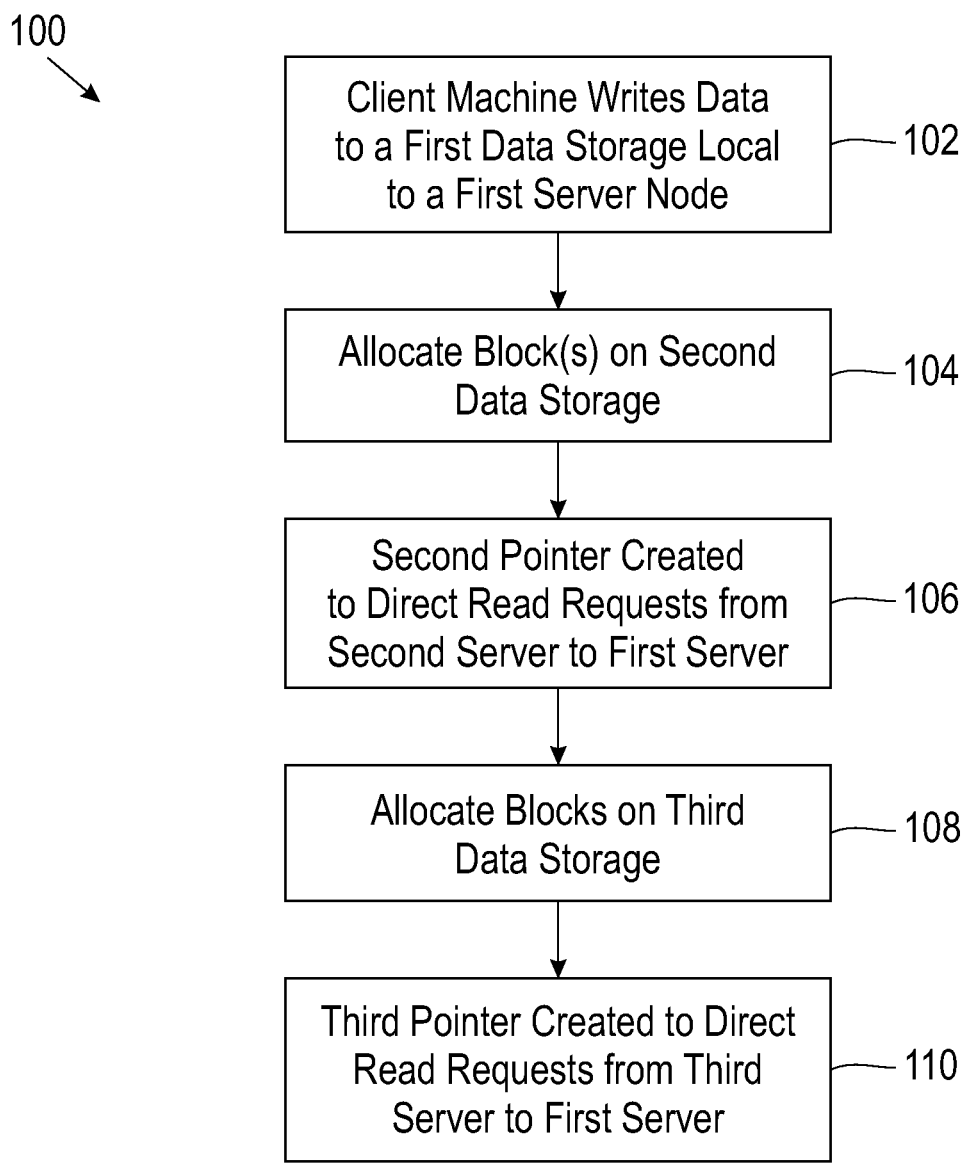
FIG. 1 is a flow chart illustrating a general process for writing data to data storage.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers, server, and clients. A functional unit may be implemented in programmable hardware devices such as field programmable gate arrays, programmable array logic, programmable logic devices, or the like. The functional unit may also be implemented in software for processing by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers (write manager, allocation manager, pipeline manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cluster file system is an enterprise storage file system which can be concurrently accessed for reading and writing by multiple computers. More specifically, in such file systems the computers are in the form of cluster servers which connect to an underlying storage device. There are different architectural approaches to a shared disk file system, including distribution of file information across all the servers in the cluster to provide a consistent file system image across the cluster servers. Each storage device in the storage file system has a plurality of blocks; each block is a fixed size unit of data on a storage device. Data is written to storage in groupings of blocks, and is similarly read from storage in groupings of blocks. In one embodiment, file systems address data in blocks which contain a certain number of disk sectors; the smallest amount of disk space that can be allocated for reading and writing.

The cluster file system configured with commodity components commonly employ a triple replication scheme. Although not universally employed, and not required, this replication scheme provides resiliency in the event of failure of one or more nodes in the cluster. Replicating data across the cluster is desirable in order to support resiliency. At the same time, it is beneficial to replicate the data in a manner that reduces or otherwise has a negligible affect on network bandwidth. It is understood that in one embodiment, data may be replicated more than three times.

FIG. 1 is a flow chart (100) illustrating the general process for writing data to data storage and allocating blocks of data in a cluster file system to support replication of the data across the cluster. Initially, a client machine in communication with the cluster file system writes data to a first data storage local to a first server node in the cluster (102). Once the writing of data is completed at step (102), there is an initial copy of the data stored in the cluster file system. To replicate the data across the cluster, storage blocks are allocated on data storage remote from the first server. More specifically, storage blocks are allocated on a second data storage local to a second server node in the cluster (104). The process of allocating blocks on the second data storage reserves space for the data replication. Following step (104), a second pointer is created to direct any read requests for the data received by the second server to the first server (106). The basis for the second pointer is that until the data replication has been completed, the second server cannot service any requests to read the data. As such, all read requests must be direct to the server node local to the data storage housing the data, and not merely containing allocated storage blocks.

As noted above, the replication scheme employed herein is a triple replication scheme, and as such storage blocks are allocated on a third data storage local to a third server node and remote from the first and second server nodes (108). Following step (108), a third pointer is created to direct any read requests for the data received by the third server to the first server (110). Although the server nodes are referred to herein as first, second, and third server nodes, it is noted that the cluster file system may include a greater quantity of server nodes and should not be limited to the three discussed herein. It is further noted that the identification of first, second, and third is merely to identify that such actions are taking place on three separate and distinct server nodes in the cluster file system. In one embodiment, the replication system may be expanded to include a quantity greater than or less than the three described herein. Accordingly, for each server node hosting a replication of the data, storage blocks are allocated to accommodate the replication, and a pointer is created to direct all read requests to the first server node until such time as the replication on the respective secondary server nodes is complete.

Figure 2:
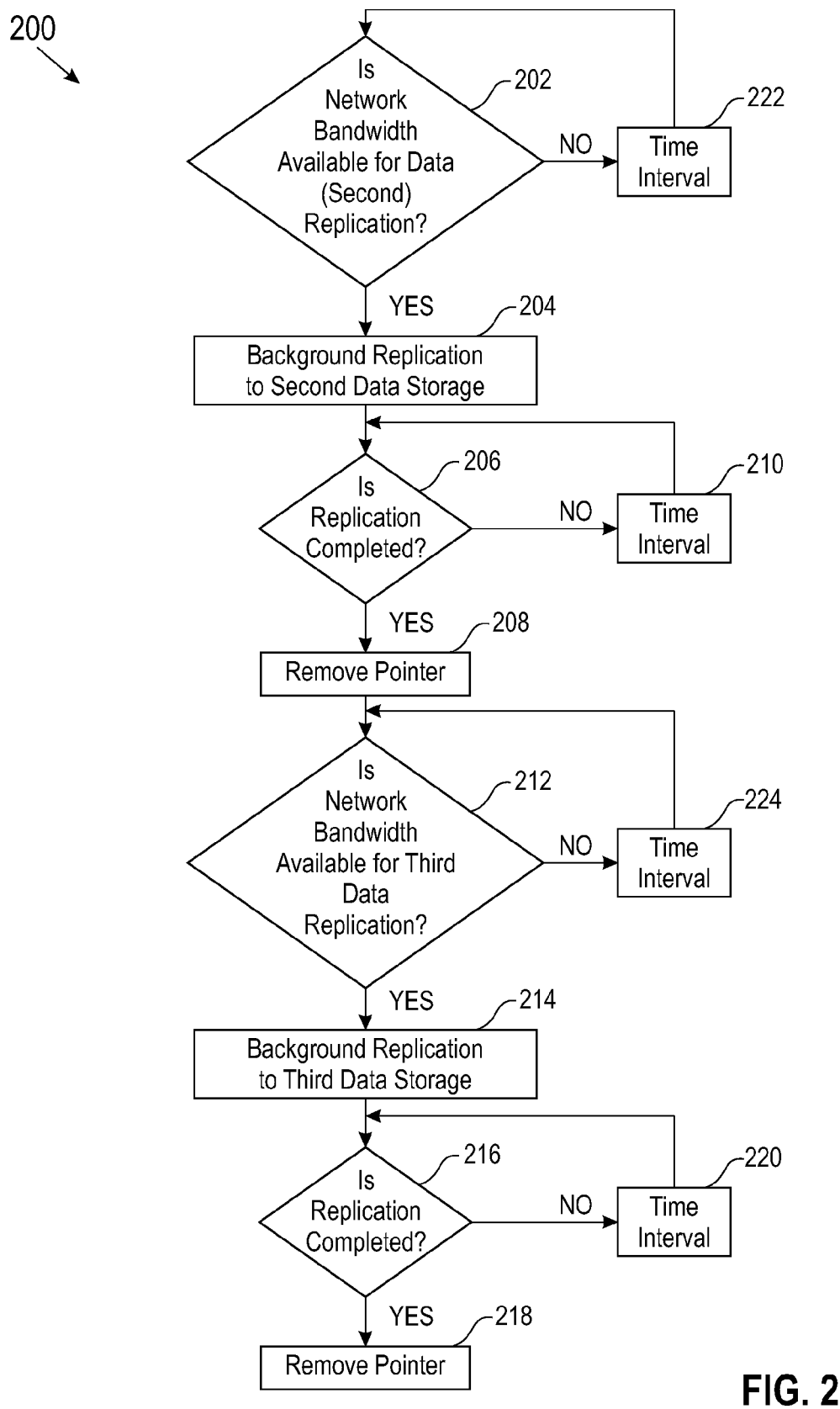
FIG. 2 is a flow chart illustrating use of pointers employed in data replication.

Once the data replication is completed, the pointer re-directing read requests may be removed. FIG. 2 is a flow chart (200) illustrating a process for removal of the pointers created local to the secondary server nodes in conjunction with the block allocation. A test is conducted to determine opportunistic network availability for replication of the data from the data storage local to the first server node to the second data storage local to the second server (202). In one embodiment, opportunistic network availability is based upon network bandwidth. For example, it is generally desirable to utilize network bandwidth for replication transactions at a time when the network is under-utilized. A positive response to the determination at step (202) is followed by a background replication of the data from the data storage local to the first server node to the data storage local to the second server node (204). Time for completion of the replication will vary depending upon both the network bandwidth and the size of the transaction. Following step (204), it is determined if the replication started at step (202) is completed (206).

A positive response to the determination at step (206) is following by removal of the pointer (208). Until the replication of the data from the data storage local to the first server node is complete, the pointer from the second data storage to the first data storage is not removed. As such, a negative response to the determination at step (206) is followed by waiting for a period of time while the replication continues (210). When the period of time at step (210) is completed, the process returns to step (206). In one embodiment, the period of time employed at step (210) may be either a fixed period of time or a modifiable period of time. Similarly, in one embodiment, the pointer in the data storage is replaced by a flag in metadata space of the allocated storage blocks. In one embodiment, the presence of the flag indicates that the data replication is completed and the data is available. Alternatively, in one embodiment, the flag may be configured such that the presence of the flag indicates that the data replication is not complete and data access is only available at the first data storage.

In one embodiment, replication of the data in the cluster file system is performed on a serial basis. More specifically, once the replication of the data on the second data storage is completed, a second copy of the data for replication on the third data storage is started. As illustrated, following removal of the pointer at step (208), it is determined if there is an opportunistic network availability for replication of the data from the data storage local to the first server node to the third data storage local to the third server (212). A positive response to the determination at step (212) is followed by a background replication of the data from the data storage local to the first node to the data storage local to the third server (214). In one embodiment, the replication at step (214) may be from the first copy of the data local to the second server to the data storage local to the third server. Regardless of the embodiment employed, time for completion of the replication will vary depending upon both the network bandwidth and the size of the transaction.

Following step (214), it is determined if the replication started at step (212) is completed (216). A positive response to the determination at step (216) is followed by removal of the pointer (218). Until the replication of the data from the data storage local to the third data storage is completed, the pointer from the third data storage cannot be removed. As such, a negative response to the determination at step (216) is followed by waiting for a period of time while the replication continues (220). When the period of time at step (220) is completed, the process returns to step (216). In one embodiment, the period of time employed at step (220) may be either a fixed period of time or a modifiable period of time. Similarly, in one embodiment, the pointer in the third data storage is in the form of a flag in the metadata of the allocated storage blocks of the third data storage. In one embodiment, the presence of the flag indicates that the data replication is completed and the data is available. Alternatively, in one embodiment, the flag may be configured such that the presence of the flag indicates that the data replication is not complete and data access is only available to support a read transaction at the first or second data storage locations. Accordingly, as demonstrated in FIG. 2, storage blocks are allocated and a tool is employed as an indicator when replication is completed to the allocated storage blocks.

In both steps (202) and (212), it is demonstrated that the replication does not occur on demand, rather the replication occurs during network bandwidth availability. For example, the replication process may be considered a lazy replication scheme that permits the replication to occur during network down-time to improve write performance for large write transaction. This is a compromise between availability of the data to reduce network traffic and write latency. A negative response to the determinations reflected at steps (202) and (212) are followed by a delay of a time interval (222) and (224), respectively. In one embodiment, the time interval may reflect a set period of time. However, in one embodiment, the time interval at steps (222) and (224) reflects a dynamic approach wherein the process of replication continues when the network bandwidth is available.

Figure 3:
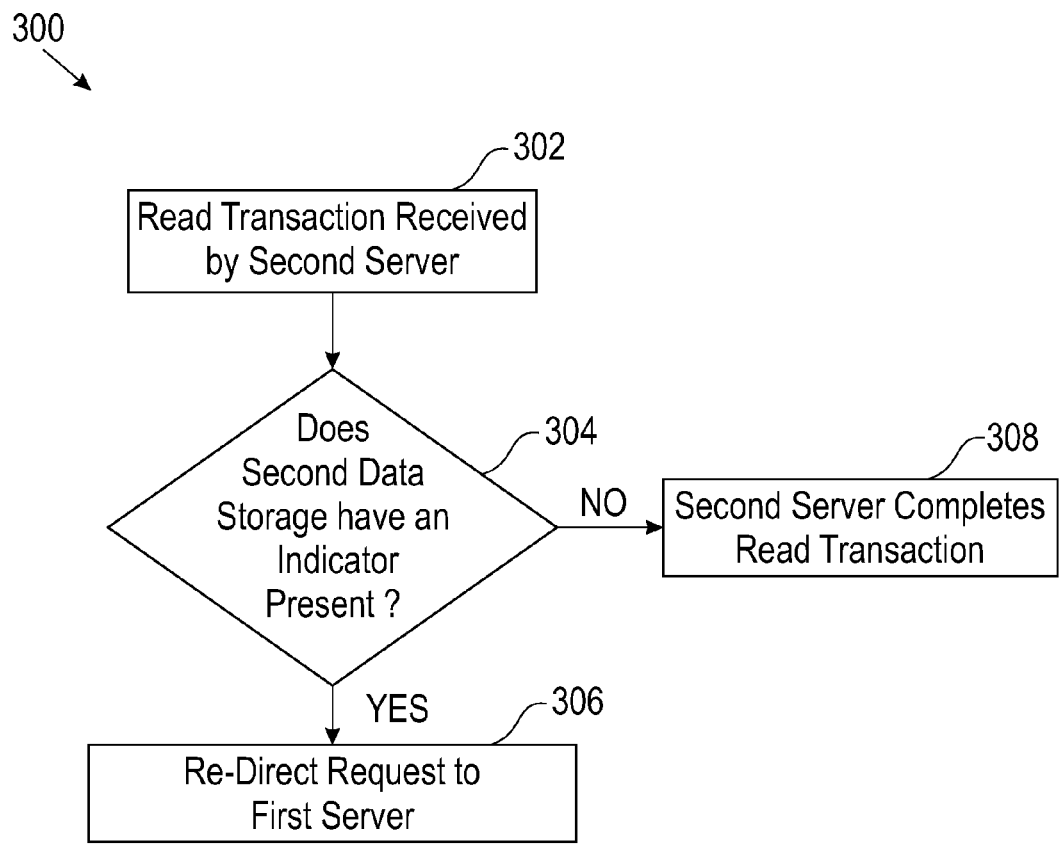
FIG. 3 is a flow chart illustrating receipt of a read transaction at a data replication site.

There are two categories of transactions between a client machine and a server node, including a write transaction and a read transaction. In a write transaction, data may be written to data storage, and then replicated across the cluster; in a read transaction, stored data may be read from data storage. As explained with respect to data replication, there may be limitations associated with reading data, including but not limited to completion of data replication, load on a specific data storage, and network bandwidth. FIG. 3 is a flow chart (300) illustrating a read request directed to the data storage local to the second server node. As shown, a read request directed from a client to the second data storage is received by the second server (302). Following receipt of the request, it is determined whether there is a pointer, or another form of an indicator, present with respect to the second data storage indicating that the replication of data to the allocated storage blocks is completed (304). A positive response to the determination at step (304) is followed by re-directing the request to data storage local to the first server node (306). Conversely, a negative response to the determination at step (306) is followed by the second server completing the read request for the requesting client (308).

Figure 4:
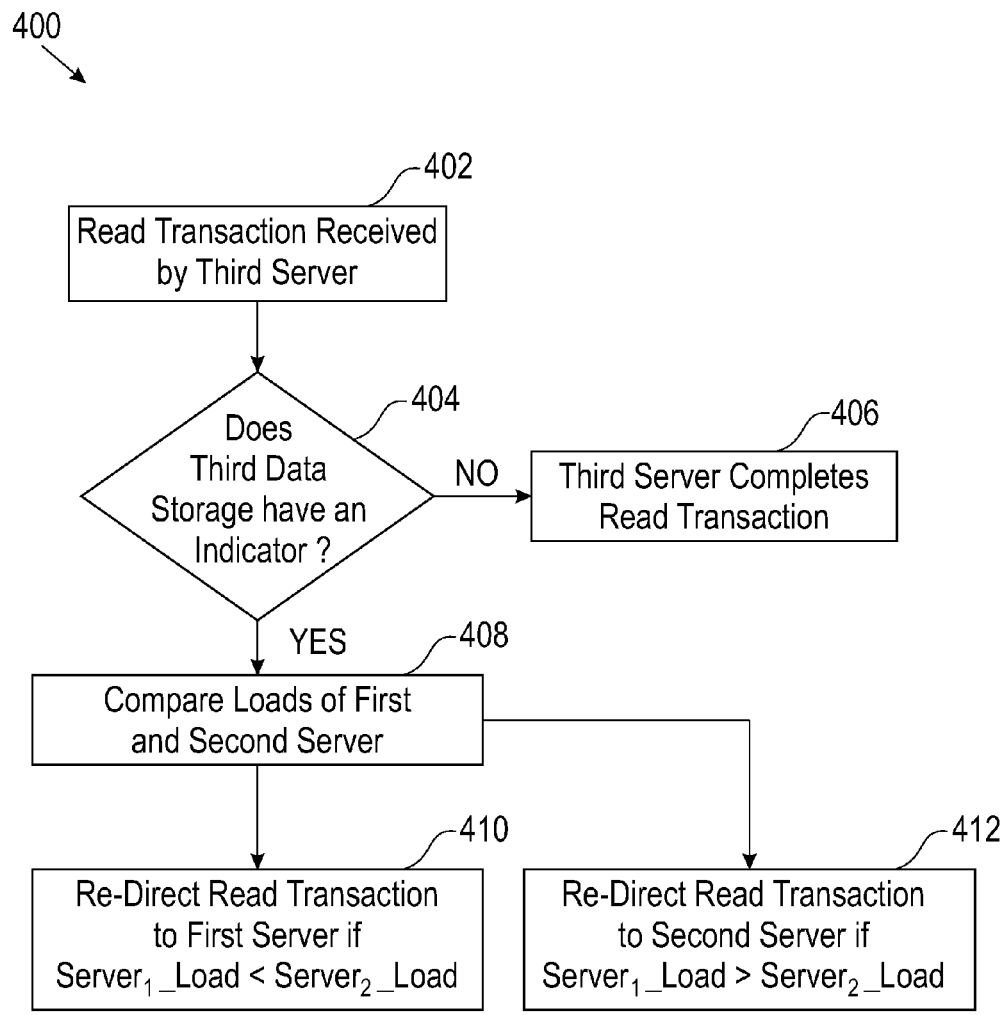
FIG. 4 is a flow chart illustrating processing of a read transaction and re-direction thereof.

As demonstrated in the write transaction, a minimum of three copies of data are maintained in the cluster, thereby requiring two replications. FIG. 4 is a flow chart (400) demonstrating processing of a read transaction received from a client machine when there is at least one replication of the data in the cluster. A read transaction directed to the third data storage is received by the third server (402). Following receipt of the transaction, it is determined whether there is a pointer, or another form of an indicator, present with respect to the third data storage indicating that the replication of data to the allocated storage blocks is completed (404). If it is determined at step (404) that the replication is complete, i.e. absence of the pointer, the third server completes the read transaction for the requesting client (406). Conversely, if at step (404) it is determined that the replication is not complete, i.e. presence of the pointer, the read transaction may be directed to either the second server or the third server which may process the request. It should be noted that in one embodiment, if both the second and third server fail to process the request, an error may be returned.

In one embodiment, the load of the first and second servers is compared to determine an optimal candidate to satisfy the read transaction (408). If the load of the first server is less than the load of the second server, then the read request is re-directed to the first server to satisfy the read transaction (410). Conversely, if the load of the second server is less than the load of the first server, then the read transaction is re-directed to the second server to satisfy the read transaction (412). Accordingly, in a cluster with at least one replication of the data complete, one of two servers may be available to satisfy the read transaction and to maintain load balance between the two available servers.

Data replicated across the cluster is employed for reliability while optimizing performance. For example, in an embodiment with three replications of the data, each copy is on a different data storage local to a different server in the cluster. A read transaction to either the second or third server node solicits the status of the respective replication and/or evaluates load on the respective servers to assess which server should process the read transaction while maintaining a load balance of the servers. Accordingly, the read transaction is directed to one of the server nodes in the cluster that is optimal for servicing the transaction based upon one or more factors.

Figure 5:
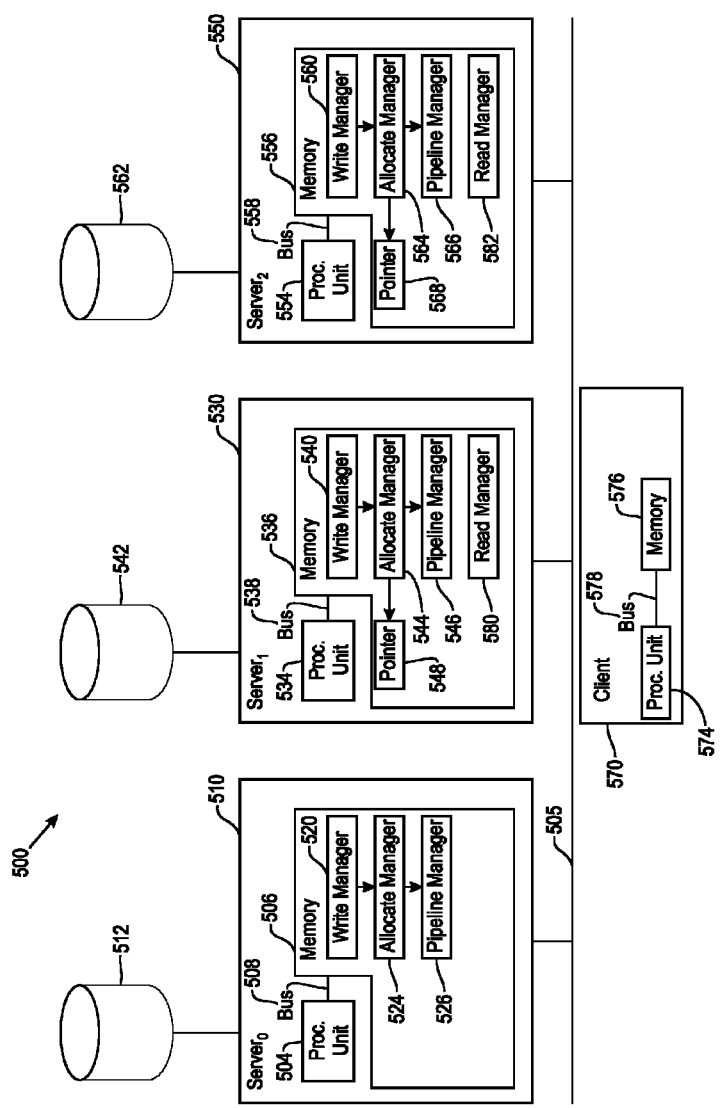
FIG. 5 is a block diagram of a computer system with tools to support replication of a write transaction in a cluster file system, according to the preferred embodiment of this invention, and is suggested for printing on the first page of the issued patent.

As demonstrated in the flow charts of FIGS. 1-4, a method is employed to support replication of a write transaction across server nodes of a cluster file system, and to support a read transaction from the data storage designated for storing data of the write transaction. FIG. 5 is a block diagram (500) illustrating tools embedded in a computer system to support replication of a write transaction across one or more server nodes of the cluster file system. More specifically, a cluster file system is shown mounted on multiple servers (510), (530), and (550). A clustered file system is a file system that is simultaneously mounted on multiple servers. Although three servers are shown in the example herein, the invention should not be limited to this quantity of servers in the clustered file system. Similarly, although only one cluster is shown herein, in one embodiment, there may be multiple clusters provided with cross-cluster communication supported over a network connection.

Each of the servers in the system is provided with local data storage, and at the same time may communicate with remote storage on an intra-cluster or an inter-cluster basis. More specifically, a first server (510) is provided with a processing unit (504), in communication with memory (506) across a bus (508) and in communication with a first data storage (512); a second server (530) is provided with a processing unit (534), in communication with memory (536) across a bus (538), in communication with a second data storage (542); and a third server (550) is provided with a processing unit (554), in communication with memory (556) across a bus (558), in communication with a third data storage (562). At the same time, the first server (510) may communicate with remote data storage (542) and (562) across a network connection (505), the second server (530) may communicate with remote data storage (512) and (562) across network connection (505), and the third server (550) may communicate with remote data storage (512) and (542) across network connection (505).

In the example shown herein, each of the data storages (512), (542), and (562) are configured to receive a request to store data from the respective server (510), (530), and (560). More specifically, a client machine (570) is provided in communication with the server nodes (510), (530), and (560). The client machine (570) is provided with a processing unit (574) in communication with memory (576) across a bus (578). The client machine (570) may communicate with the server nodes for both read and write transactions. Although only one client machine (570) is shown in the example to support read and write transactions with the cluster, the invention should not be limited to the quantity shown herein. In one embodiment, there may be two or more client machines in communication with the cluster. Similarly, the invention should not be limited to the quantity of server nodes shown herein, the quantity of data replications across the cluster, or the quantity of clusters shown herein. Each of these factors is variable.

Within the cluster file system, a write manager is provided to write a copy of data received from the client machine (570) to data storage local to one of the server nodes in the cluster. In the example shown herein, server node (510) is configured with a write manager (520) is local to memory (506) of server (510). Similarly, server (530) is configured with write manager (540) local to memory (546), and server (550) is configured with write manager (560) local to memory (556). Each write manager (520), (540) and (560) is local to the respective server and is configured to communicate with the client machine (570) to write a first copy of data received from the client machine to local data storage of the respective server.

To support the replication of data received in the cluster file system, an allocation manager is provided local to each of the server nodes. In the example shown herein, server node (510) is provided with an allocation manager (524) to communicate with the write manager (520) in order to allocate storage space on the first storage device (512). Similarly, allocation manager (544) is provided to communicate with write manager (540) to allocate storage space on the second storage device (542), and allocation manager (564) is provided to communicate with write manager (560) to allocate storage space on the third storage device (562). Accordingly, each allocation manager functions with the respective write manager to support and ensure that there is a sufficient block allocation to support a write transaction and replication.

As noted above, the allocation manager may be distributed locally to each server node to enable local management of data block allocation. In one embodiment, the allocation manager may be local to one server node in the cluster file system designated to manage allocation of data blocks to support replication of a write transaction across the cluster. In addition to the write and allocation managers, a pipeline manager is provided to communicate with the allocation manager(s) for opportunistically scheduling population of the allocated data blocks to support replication of data. More specifically, the pipeline manager is responsible for determining an appropriate time for the replication process to take place across the cluster in a manner that takes advantage of available network bandwidth. In one embodiment, the pipeline manager invokes a technique to begin executing a second instruction for replication of allocated data blocks before a first instruction for replication of allocated data blocks has been completed. With respect to this embodiment, several instructions are in the pipeline simultaneously, with each instruction at a different processing stage. In an embodiment without a set of distributed allocation managers, a pipeline manager (526) is provided local to server node (510) and in local communication with the local allocation manager (524). Similarly, in an embodiment with distributed allocation manager(s), pipeline manager(s) (546) and (566) are each provided in communication with each of the distributed allocation managers (544) and (564), respectively, to facilitate the process of scheduling the population of the allocated storage blocks.

Following the block allocation and prior to population of the allocated blocks, a pointer is employed to direct a read transaction to a location where the data is stored. More specifically, until such time as the data replication is completed, the local server node cannot process and support a read transaction directed to the replicated data. A pointer is created local to each server node with a data block allocation to support the data replication. In one embodiment, a metadata flag is employed in place of a pointer. As shown, in FIG. 5 by way of example, server nodes (530) and (550) are each designated to receive a copy of the replicated data. Pointer (548) is established at server node (530) upon completing the block allocation. Similarly, a pointer (568) is established at server node (550) upon completing the block allocation. Each of the pointers (548) and (568) functions to re-direct a read of the non-replicated data to the source server node (510). At such time as the allocated blocks have received the replicated data, the local pointer is removed by the respective allocation manager so that a read transaction may be serviced locally. More specifically, when the data replication on data storage (542) is completed, pointer (548) is removed by allocation manager (544), and, when the data replication on data storage (562) is completed, pointer (568) is removed by allocation manager (564).

To ensure a proper direction for a read transaction is satisfied, a read manager is provided to self direct a read transaction to a location configured to satisfy the request. As shown, the read manager is local to the respective server node. More specifically, read manager (528) is provided local to server node (510), read manager (580) is provided local to server node (530), and read manager (582) is provided local to server node (550). After pointer (548) is removed by allocation manager (544), read manager (580) self directs a read request to server node (530). Similarly, after pointer (568) is removed by allocation manager (564), read manager (582) self directs a read request to server node (550).

The components shown and demonstrated herein for a single cluster configuration may be extrapolated across each cluster in the network. In a multi-cluster configuration, a tool may be employed to select one of the clusters to write the data replication. For example, if one of the clusters in the network has characteristics that exhibit likelihood to fail, the tool may select a different cluster to write the second and/or third copy of data. Selection of available data blocks takes into consideration metadata transactions and likelihood of failure of a cluster. By writing data to data storage of a different but more stable cluster, the likelihood of access to and availability of the data is increased.

As identified above, the write managers (520), (540), and (560), allocation managers (524), (544), and (564), pipeline manager (526), (546), and (566), and read managers (580) and (582) function to manage data replication in a cluster file system to support a write transaction which creates two or more copies of the data. The managers are shown residing in memory local to the server or client machine. More specifically, write manager (520), allocation manager (524), and pipeline manager (526) each reside in memory (506) of server (510); write manager (540), allocation manager (544), pipeline manager (546), and read manager (580) each reside in memory (536) of server (530); and write manager (560), allocation client (564), pipeline manager (566), and read manager (582) each reside in memory (556) of server (550). In one embodiment, the write manager(s), allocation manager(s), pipeline manager(s), and read manager(s) may reside as hardware tools external to memory of their respective server, or they may be implemented as a combination of hardware and software. Similarly, in one embodiment, the managers may be combined into a single functional item that incorporates the functionality of the separate items. As shown herein, each of the manager(s) are shown local to the respective servers. However, in one embodiment they may be collectively or individually distributed across the network and function as a unit to manage block allocation and data replication in support of a write transaction. Accordingly, the managers may be implemented as software tools, hardware tools, or a combination of software and hardware tools, to collect and organize data content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. A non-exhaustive lost of more specific examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
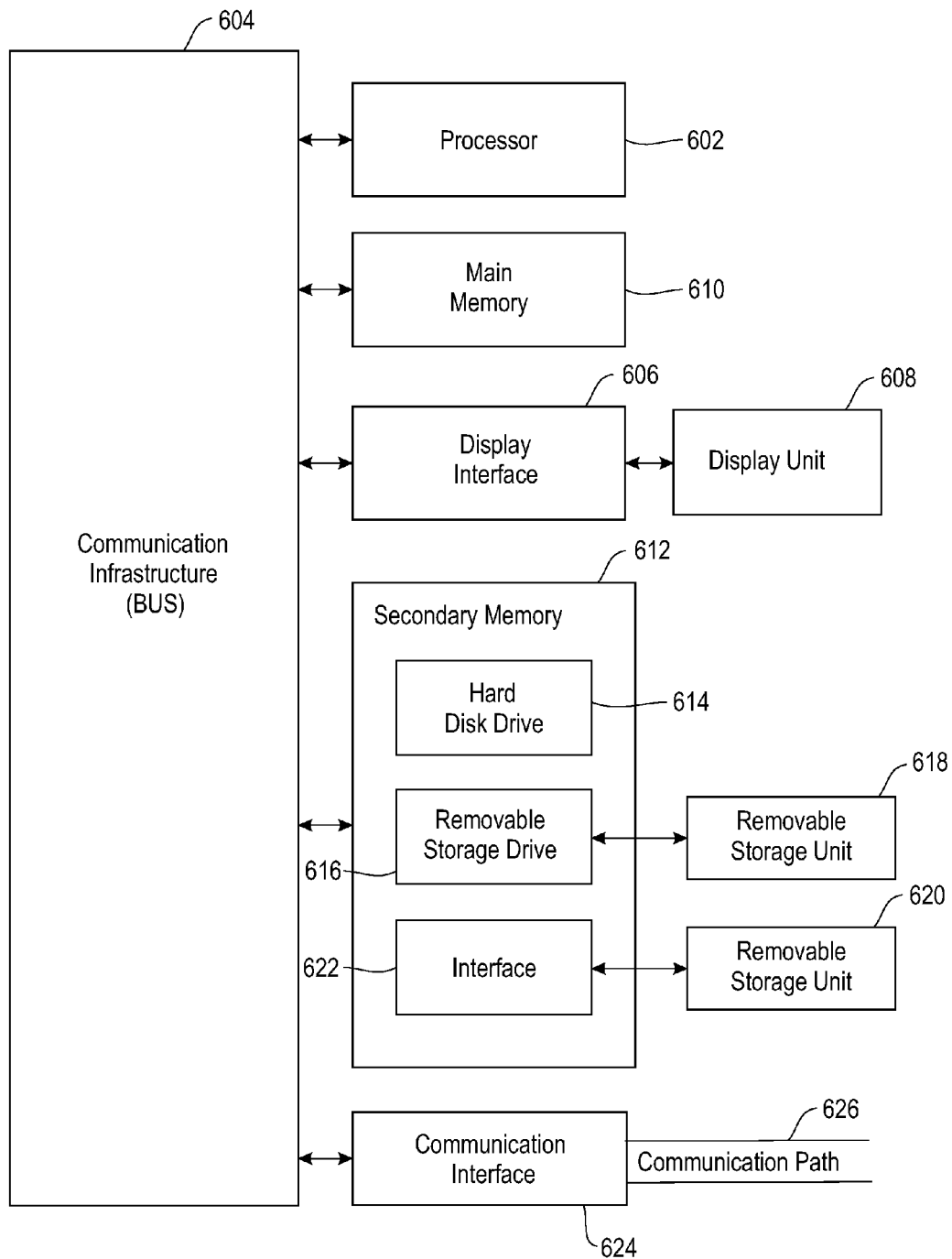
FIG. 6 is a block diagram showing a system for implementing an embodiment of the present invention

Referring now to FIG. 6 is a block diagram showing a system for implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read and written by a removable storage drive (616). As will be appreciated, the removable storage unit (618) includes a computer readable medium having stored therein computer software and/or data.

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) are in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in a hard disk drive (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the data replication may occur out of the order noted in the figures. For example, two blocks of the cluster file system shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured with a central manager or a distributed set of managers to direct the replication of data within the cluster. Similarly, in one embodiment, there may be multiple cluster file systems with replication of the data occurring on an inter-cluster basis. Accordingly, the scope of protection of this invention is limited only by the following claims and their equivalents.

We claim:

1. A system comprising:
a cluster file system having server nodes in communication across a network, the cluster including a first data storage local to a first server node, a second data storage local to a second server node, and a third data storage local to a third server node;
a write manager to write a first copy of data from a client machine to the first data storage local to the first server node;
an allocation manager in communication with the write manager, the allocation manager to allocate storage for a second copy of the data on the second data storage local to the second server node and to allocate storage for a third copy of the data on the third data storage local to the third server node in response to a pipeline manager replication of the first copy of data, wherein the allocation manager to create a second pointer from the allocated storage of the second server node to the first copy of data and to create a third pointer from the allocated storage of the third server node to the first copy of the data, and further comprising the allocation manager to remove the second pointer following completion of population of the second data storage local to the second server node with the first copy of the data, and to remove the third pointer following completion of population of the third data storage local to the third server node with the first copy of the data; and
the pipeline manager in communication with the allocation manager, the pipeline manager to schedule population of the second data storage and the third data storage with the first copy of the data based upon network characteristics.

2. The system of claim 1, further comprising the second pointer to re-direct a second read request from the second server node to the first node, and the third pointer to re-direct a third read request from the third server node to the first server node.

3. The system of claim 2, further comprising a read manager to self direct a read request to the second node following removal of the second pointer, and to self direct a read request to the third node following removal of the third pointer.

4. The system of claim 1, wherein scheduling by the pipeline manager is opportunistic with respect to network bandwidth availability.

5. A computer program product, the computer program product comprising a computer readable storage medium having computer readable program code embodied therewith, the computer readable program code comprising:
computer readable program code configured to write a first copy of data on a first data storage local to a first server node;
computer readable program code configured to pipeline replication of the first copy of data on the first server node, including allocating storage for a second copy of the data on a second data storage local to a second server node and allocating storage for a third copy of the data on a third data storage local to a third server node, wherein the computer readable program code to allocate storage further comprising computer readable program code configured to create a second pointer from the allocated storage of the second server node to the first copy of data and to create a third pointer from the allocated storage of the third server node to the first copy of data, and further comprising computer readable program code configured to remove the second pointer following completion of populating the second data storage local to the second server node with the first copy of the data, and computer readable program code to remove the third pointer following completion of populating the third data storage local to the third server node with the first copy of the data; and
computer readable program code configured to schedule populating the allocated storage on the second data storage and the allocated storage on the third data storage with the first copy of the data based upon network characteristics.

6. The computer program product of claim 5, further comprising computer readable program code configured to have the second pointer re-direct a second read request from the second server node to the first node, and the third pointer re-direct a third read request from the third server node to the first server node.

7. The computer program product of claim 6, further comprising computer readable program code configured to self direct a read request to the second node following removal of the second pointer, and to self direct a read request to the third node following removal of the third pointer.

8. The computer program product of claim 5, wherein the computer readable program code to schedule populating the second data storage and the third data storage with the first copy of the data is opportunistic with respect to network bandwidth availability.

* * * * *